July 21, 1964  R. J. NOTES  3,141,184
ATTACHMENT FOR MIXERS OR THE LIKE
Filed Jan. 4, 1962

INVENTOR.
Robert J. Notes
BY Owen & Owen
Attys

Patent 3,141,184

3,141,184
ATTACHMENT FOR MIXERS OR THE LIKE
Robert J. Notes, 3094 N. Adrian Road, Adrian, Mich.
Filed Jan. 4, 1962, Ser. No. 164,231
9 Claims. (Cl. 15—97)

This invention relates to an attachment for mixers or the like and particularly to an attachment for electric mixers for cleaning, scouring, polishing, or performing similar operations on various household items and especially kitchen utensils.

Attachments for mixers have heretofore been known by means of which attachments silverware can be polished or pots can be scoured, for example. Such attachments, however, have various limitations including high cost, lack of adaptability for use on various types of mixers, being generally hard to use, and lack of sufficient stability.

A mixer attachment according to the present invention has many advantages over those heretofore known. The new attachment can fit with the regular beater blade assembly of a mixer and can be used with a vast majority of commercially-available mixers; it does not require any special shafts or other connections which are usually suitable only for one particular brand or type of mixer. The new attachment can be made of a single, integral piece of resilient material such as plastic and consequently is much less expensive than those heretofore known which have been of a comparatively complicated nature. The attachment can be easily attached to and detached from the blade assembly and yet is held securely therewith to prevent looseness or wobbling of the attachment during rotation thereof. It also can be readily adapted for either scouring or polishing various items, as desired.

It is, therefore, a principal object of the invention to provide a low cost attachment suitable for connection with many types of beater blade assemblies for mixers and the like, for performing such operations as cleaning, polishing, and scouring various household items.

Other objects and advantages of the invention will be apparent from the following detailed description of a preferred embodiment thereof, reference being made to the accompanying drawing, in which.

Figure 1:
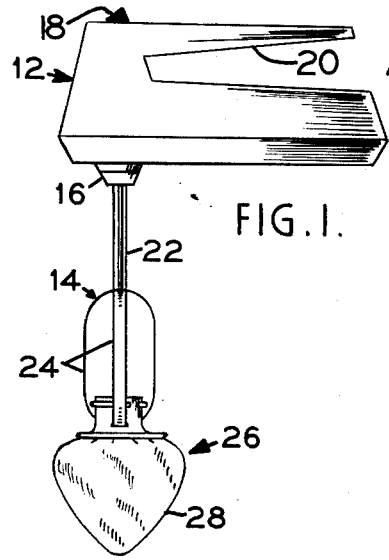
FIG. 1 is a side view in elevation of a portable electric mixer having a beater blade assembly to which an attachment according to the invention is connected.

Referring to the drawings, and more particularly to FIG. 1, an electric mixer, of the portable type in this instance, is indicated at 10 and includes a housing 12 containing a suitable motor, speed controls, and gears which drive a beater blade assembly indicated at 14. The blade assembly 14 is inserted into suitable socket connections 16 in the front portion of the housing 12 to provide a driving connection, all of which is well known in the art. The housing 12 has a switch 18 to control operation of the drive motor and has a handle 20 by means of which the mixer is supported and manipulated during operation. The mixer 10 can also be of the table type with the housing pivotally supported on a suitable stand.

The beater blade assembly 14 includes a driven, vertical shaft 22 which supports beater blades 24 attached to intermediate and end portions of the shaft 22. Usually four of the blades 24 are used although sometimes only two are employed. Two of the beater blade assemblies 14 commonly are placed adjacent one another with the shafts 22 parallel and driven so that the blades 24 nest with one another but do not touch during rotation.

Figure 3:
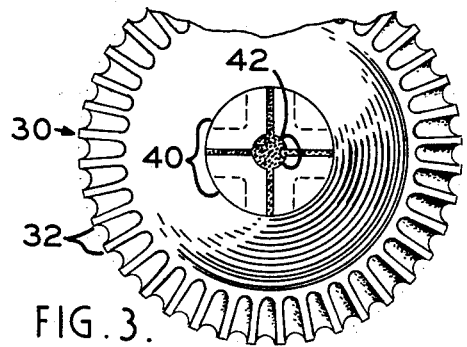
FIG. 3 is a top view of the attachment.
Figure 5:
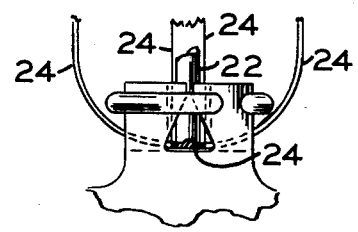
FIG. 5 is a detailed, fragmentary view of a neck portion of the attachment connected with a portion of the beater blade assembly.
Figure 4:
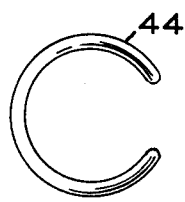
FIG. 4 is a plan view of a split ring employed with the attachment shown in FIGS. 1–3.
Figure 2:
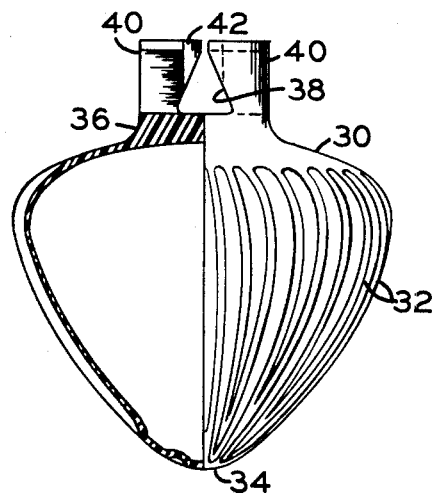
FIG. 2 is an enlarged view, half in cross section and half in elevation of the attachment shown in FIG. 1.

An attachment 26 embodying the principles of the invention is fastened to the lower end of the blade assembly 14 and is rotated therewith. In the case of portable mixers, the mixer is usually moved by the handle relative to the item being polished, etc. For table type mixers, the housing is usually tilted to provide more room for using the attachment 26 with the mixer kept stationary as the item to be polished, etc. is moved relative thereto. The attachment 26 is quite versatile. If a pot is to be scoured, for example, the attachment can be used as shown in FIGS. 2 and 3 while if silver is to be polished, a sock 28 (FIG. 1) of fine nylon mesh fabric or the like can be slipped over and tied on the attachment 26.

Referring more particularly to FIGS. 2–5, the attachment 26 includes a main body 30 which has a plurality of vertical ridges or ribs 32 thereon terminating near a lower end 34. The ridges 32 are quite effective in removing food or dirt from an item and the generally inverted conical configuration of the body 30 enables it to be adapted to many corners and contours of items which otherwise could not be adequately contacted. The body 30 preferably is hollow and has a relatively thin wall (see FIG. 2) preferably made of a somewhat resilient plastic material such as nylon or the like so that it can yield and conform to particular surfaces during a cleaning, etc. operation. The thin plastic wall of the body 30 is integral with a neck 36 containing mutually perpendicular slots 38 which are wider at the bottom than at the top, which slots are adapted to fit with the beater blades 24, one being shown in cross section in FIG. 5. The slots 38 divide the neck 36 into quadrants 40, the inner corners of which are notched out at 42 to provide a central hole which receives the portion of the shaft 22 which is located between the blades 24.

When the neck 36 is assembled with the blades 24 and the lower portion of the shaft 22, the blades are forced into the slots 38 and the opening formed by the notches 42 at the same time receives the lower portion of the shaft 22. After the neck 36 is pushed onto the lower end of the blade assembly 14, a split ring 44 can be placed on the neck to serve primarily as a safety device because the neck alone provides a sufficiently secure connection, in most instances. The ring 44 can be slipped on the shaft 22 with the gap between the ends of the ring being sufficiently large to encompass the shaft. The ring 44 is then pushed downwardly on the neck 36 and can be positioned against the blades to wedge them between the ring 44 and the bottom of the slots 38, if desired; the ring also urges the segments 40 against the shaft 22. If the attachment is pulled downwardly, the blades 24 wedge against the sides of the slots 38 and thereby urge the segments 40 outwardly which provides tighter engagement between the segments 40 and the ring 44. Hence, the only way the attachment can be removed is by slipping the ring 44 off the neck 36 while keeping the blades 24 near the bottom of the slots 38. A very secure attachment thereby is attained so that the attachment 26 cannot wobble or become loose during rotation.

Figure 6:
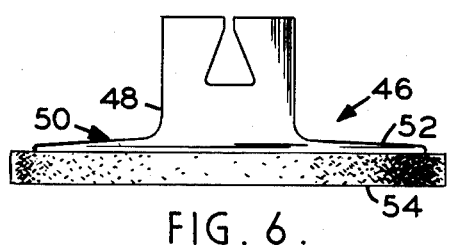
FIG. 6 is a view of a somewhat modified attachment embodying the principles of the invention.

The body 30 of the attachment 26 can be of other configurations for specific purposes. By way of illustration, a modified attachment 46 is shown in FIG. 6 which includes a neck 48 which is similar to the neck 36 of FIG. 2 and is attached to the blade assembly 14 in the same manner. However, in this instance, the attachment 46 has a flat body 50 which includes a flange 52 and a resilient pad 54. If desired, a sock or pad can be fastened on the body 50, which sock can be of various mesh materials of varying smoothness to provide either a scouring or a polishing attachment particularly for flat surfaces.

Various modifications of the above described embodiments of the invention will be apparent to those skilled in the art, and it is to be understood that such modifications can be made without departing from the scope of the invention, if they are within the spirit and tenor of the accompanying claims.

What I claim is:

1. An attachment for a beater blade assembly of a mixer or the like comprising an attaching, resiliently flexible neck and a body extending outwardly therefrom, said neck having mutually perpendicular slots therein dividing said neck into four equal quadrants, said slots being wider at the bottom than at the top, and a split ring adapted to slide over and encompass a portion of said neck when blades of said blade assembly are in said slots, to prevent spreading of said quadrants, the inner corners of said quadrants being notched to receive a central shaft of the blade assembly.

2. An attachment for a beater blade assembly of a mixer or the like comprising an attaching, resiliently flexible neck and a body extending outwardly therefrom, said neck having mutually perpendicular slots therein dividing said neck into four equal quadrants, said slots being wider at the bottom than at the top, and the inner corners of said quadrants being notched to receive a central shaft of the blade assembly.

3. An attachment for a beater blade assembly of a mixer or the like, said attachment comprising an attaching neck and a body extending outwardly therefrom, said neck and said body being made of resiliently flexible material, said neck having two generally mutually perpendicular slots therein extending from the end opposite the body and terminating short of the entire body, and dividing said neck into four substantially equal quadrants, said slots being wider at the bottom than at the top.

4. An attachment according to claim 3 wherein said body is hollow.

5. An attachment according to claim 3 wherein said neck and said body are structurally integral.

6. An attachment according to claim 3 wherein said body is generally of inverted conical shape.

7. In combination with an electric mixer and a beater blade assembly rotated by the mixer, said blade assembly including a central shaft and several blades attached at intermediate and end portions of said shaft, an attachment for said assembly including an attaching, resiliently flexible neck and a body extending outwardly therefrom, said neck having slots therein corresponding to the number and position of said blades, said slots terminating short of the entire body and being wider at the bottom than at the top, said blades being in said slots, a split ring encompassing a portion of said neck between an end thereof and said blades to prevent said neck from spreading and said slots from widening, and said neck having a central passage located at the intersection of the slots in which an end portion of said central shaft of said blade assembly is located, with lower ends of said blades being at the bottom of said slots.

8. In combination with an electric mixer and a beater blade assembly rotated by the mixer, said blade assembly including a central shaft and several blades attached thereto, an attachment for said assembly including an attaching, resiliently flexible neck and a body extending outwardly therefrom, said neck having slots therein corresponding to the number and position of said blades, said slots terminating short of the entire body and being wider at the bottom than at the top, said blades being in said slots with lower ends of said blades at the bottom of said slots, and said neck having a central passage located at the intersection of the slots in which an end portion of said central shaft of said blade assembly is located.

9. An attachment for an electric mixer having a beater blade assembly rotated by the mixer, said blade assembly including a central shaft and several blades attached at an intermediate and an end portion of said shaft, said attachment including an attaching, resiliently flexible neck and a body extending outwardly therefrom, said neck having slots therein corresponding to the number and position of said blades, said slots terminating short of the entire body and being wider at the bottom than at the top and adapted to receive said blades with lower ends of said blades to be at the bottom of said slots, and said neck having a central passage located at the intersection of the slots, said passage being adapted to receive the lower end portion of said central shaft of said blade assembly.

References Cited in the file of this patent

UNITED STATES PATENTS

| | | |
|---|---|---|
| 2,444,760 | Tambini | July 6, 1948 |
| 2,738,528 | Fridge | Mar. 20, 1956 |
| 2,822,562 | Shackelford | Feb. 11, 1958 |

FOREIGN PATENTS

| | | |
|---|---|---|
| 12,903 | Great Britain | of 1909 |